United States Patent [19]

Ayres

[11] 3,872,822

[45] Mar. 25, 1975

[54] DISPOSABLE TEMPERATURE INDICATOR

[75] Inventor: Waldemar A. Ayres, Rutherford, N.J.

[73] Assignee: Becton, Dickinson and Company, East Rutherford, N.J.

[22] Filed: Aug. 20, 1973

[21] Appl. No.: 389,964

[52] U.S. Cl. .............................. 116/114.5, 73/358
[51] Int. Cl. ............................................ G01k 1/14
[58] Field of Search .......... 116/106, 114.5; 99/343; 73/356, 358

[56] References Cited
UNITED STATES PATENTS

| 945,978 | 1/1910 | Nielsen et al. | 73/358 X |
| 2,788,282 | 4/1957 | Hammond, Jr. | 116/114.5 |
| 2,915,405 | 12/1959 | Hammond, Jr. et al. | 116/106 X |
| 3,626,897 | 12/1971 | Kliewer | 116/114.5 |
| 3,682,130 | 8/1972 | Jeffers | 73/358 |
| 3,820,499 | 6/1974 | Kliewer et al. | 116/114.5 |

Primary Examiner—Richard C. Queisser
Assistant Examiner—Daniel M. Yasich
Attorney, Agent, or Firm—Kane, Dalsimer, Kane, Sullivan and Kurucz

[57] ABSTRACT

A disposable fever indicator is provided to determine whether or not a predetermined body temperature has been reached. The indicator comprises a movable member having portions disposed within a vessel and held at a first position by a material meltable at the predetermined temperature. The indicator further includes means exerting a force on the member for urging the member from the first position to a second position and removable means are provided for constraining the member in said first position.

4 Claims, 1 Drawing Figure

PATENTED MAR 25 1975 3,872,822
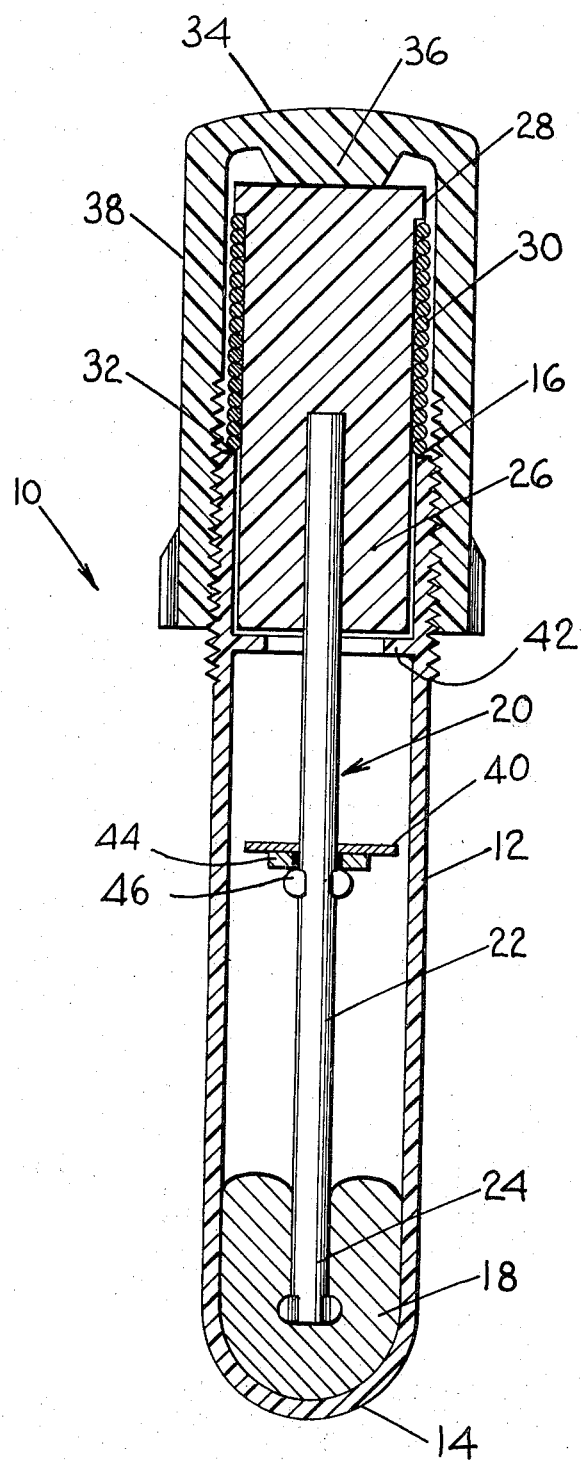

DISPOSABLE TEMPERATURE INDICATOR

BACKGROUND OF THE INVENTION

The present invention relates to a fever indicator and more particularly to a device adapted to readily determine whether or not a predetermined temperature has been reached or exceeded.

As distinct from a thermometer which is an indication of temperature over a particular range, a fever indicator serves to determine whether or not a predetermined temperature has been reached or exceeded. Such indicators are extremely useful, for example, where a mass-testing program is underway to separate the few individuals who may have temperature requiring further testing with a clinical thermometer from the masses who are healthy. For this purpose, it is especially desirable that the fever indicator be constructed in a manner that renders it sufficiently inexpensive so that it can be disposed of after a single use. In addition, since the indicator to a large extent serves as a go-no-go gauge, it is important that the indicator accurately provide indication of whether or not a patient's temperature is in excess of a safe minimum. For most purposes, a safe minimum will range between 99–99.5°F ± 0.2°F.

One problem encountered by such disposable thermometers is that of the thermometer being exposed to temperatures at or above the critical temperature during shipment or storage. Since such devices are designed to be irreversible, an inadvertent exposure of the indicator to a temperature in excess of the critical temperature would destroy the usefulness of the indicator. As stated, the critical temperature range for most purposes is between 99°–99.5°F and temperatures far in excess of this range are normally encountered in freight cars or trucks during shipment and often in storage facilities.

In view of the above, it is the principal object of the present invention to provide an accurate gauge which, after arming, serves to indicate whether or not a particular, predetermined temperature has been exceeded and which, prior to arming, is not affected by temperatures even in excess of the predetermined temperature.

A further object is to provide such a gauge which can be mass-produced at a cost sufficiently low to render the gauge disposable after a single use.

SUMMARY OF THE INVENTION

The above and other beneficial objects and advantages are attained in accordance with the present invention by providing a fever indicator for determining temperatures above a predetermined value comprising a member having portions disposed within a vessel and bonded to a section of the vessel at a first position. The bonding is accomplished by a material meltable at the predetermined temperature. The indicator further comprises means exerting a force on the member for urging the member from the first position to a second position and means constraining said member to the first position. After the constraining means is removed, the meltable material alone serves to secure the member in the first position and if subjected to a temperature above the melting point of the material, the bond melts and the force exerting means tends to move the member to the second position. However, prior to removal of the constraining means, even if the indicator is subjected to temperatures in excess of the predetermined value, the constraining means serves to prevent the force exerting means from moving the member.

BRIEF DESCRIPTION OF THE DRAWING

The accompanying drawing is a diagrammatic side elevational view of a fever indicator in accordance with the present invention.

DETAILED DESCRIPTION OF THE PREFERRED EMBODIMENT

Reference is now made to the drawing wherein a fever indicator 10 in accordance with the present invention is illustrated. The indicator 10 comprises an elongated container or vessel 12 closed at one end 14 and open at the opposite end 16. The container is formed of a material with relatively good heat conduction characteristics so as to minimize the time required for a temperature reading to be effected. Further, the container must be chemically inert and compatible with human usage without adverse effects. To this end, various plastics such as polyethylene and polypropylene are satisfactory and have the further advantage of being sufficiently inexpensive as are the remainder of the components of the present indicator so as to keep down the cost of the fever indicator and render it disposable after a single use. Also, the container 12 could be formed of a metal such as aluminum which would enhance the heat conduction from a patient to the material within the container.

Contained in the base of vessel 12 adjacent closed end 14 is a quantity of a heat meltable solid 18 such as a paraffin or wax. The solid chosen is one whose melting point is at the predetermined temperature sought to be detected. As stated, for purposes of a fever indicator, this temperature should be between 99° and 99.5° ± 0.2°F. In addition to having the desired melting point, it is important that the meltable solid chosen have a sharpness of melting and low heat of fusion as well as good heat transfer properties as possible to insure rapid melting once the melting point has been reached thereby minimizing the time the fever indicator must remain in the mouth of a patient.

Contained within the vessel 12 is a movable member 20 comprising an elongated rod 22 extending into the vessel and secured at its lower end 24 by the meltable solid 18. That is, the lower end of rod 22 is secured to the solid 18 which in turn is secured to the bottom of the vessel. A piston 26 is affixed to the top end of rod 22 and extends beyond the open end 16 of container 12. A flange 28 extends about the top of piston 26 and a spring 30 is positioned between flange 28 and the lip 32 defining the open end 16 of the vessel.

A cap 34 is provided adapted to fit over the open end of the container. The cap includes a central depending portion 36 which, when the cap is in position on the container, engages the top of piston 26 and holds it against spring 30. The cap further includes side walls 38 which threadedly or otherwise engage the sides of the container in secure engagement.

As shown, spring 30 is compressed when the lower end 24 of rod 22 is secured in wax 18. The spring thus serves to exert a force between piston flange 28 and the container lip 32 tending to drive movable member 20 out of the container. The bond effected by the solidified wax 18, however, prevents movement of member 20. If solid 18 were to melt, however, spring 30 would be free to expand and, in so doing, would drive member 20 from the first position shown to a second position where a stop 40 mounted on the rod 22 engages a fixed stop 42 mounted within the container as shown. The stop 40 comprises a flexible disk larger in diameter than the fixed stop portions 42 of the container 12. The flexible disk 40 is push fit about rod 22 and rests on a rigid disk 44 which is also push fit about the rod and located by stake portion 46 of the rod. When cap 34 is in position, the depending portion 36 prevents movement of the piston even if the wax were to melt.

Thus, until the cap is removed, the fever indicator is unarmed and regardless of the temperature to which the indicator is exposed, the piston is constrained from movement. Once the cap is removed, however, exposure of the device to a temperature in excess of the melting temperature of solid 18 releases the member so that spring 30 is free to act on the piston and lift the piston and rod vertically until the stop member abuts against fixed stop 42. This movement of the piston may be visually determined and serves as indication that the predetermined temperature has been exceeded. To this end, it may be desirable to color all or part of the piston with a distinctive color so as to facilitate the determination that the piston has moved.

Thus, in accordance with the above, the aforementioned objects are effectively attained.

Having thus described the invention, what is claimed is:

1. A fever indicator for determining temperatures above a predetermined value comprising: an elongated vessel having a closed end and an open top end, a movable elongated rod member having a first end portion disposed within said vessel at a first position, means bonding said first end of the movable member to a section of said vessel at said first position, said bonding means comprising a material meltable at said predetermined temperature, means on said open top end exerting a resilient force on said member for urging said member toward a second position, and selectively removable means engaging said top open end for constraining said member to said first position even after the predetermined temperature is reached.

2. The fever indicator in accordance with claim 1 wherein said member comprises a piston, said force exerting means comprises a compressed spring bearing against said piston and said constraining means is positioned to prevent movement of the piston under action of said spring.

3. The fever indicator in accordance with claim 2 wherein said spring is disposed within said vessel to urge said piston toward said open end and said constraining means comprises a removable closure for said open end, said closure includes portions adapted to bear against said piston whereby to prevent its movement under the action of the spring.

4. The fever indicator in accordance with claim 3 wherein said bonding means is disposed at the bottom of said vessel, said piston is disposed adjacent the top end of said vessel and further comprising a rod having one end affixed to said piston and an opposite end extending into and secured to said bonding material whereby said rod and hence said piston is prevented from movement by said bonding material.

* * * * *